United States Patent Office 3,431,981
Patented Mar. 11, 1969

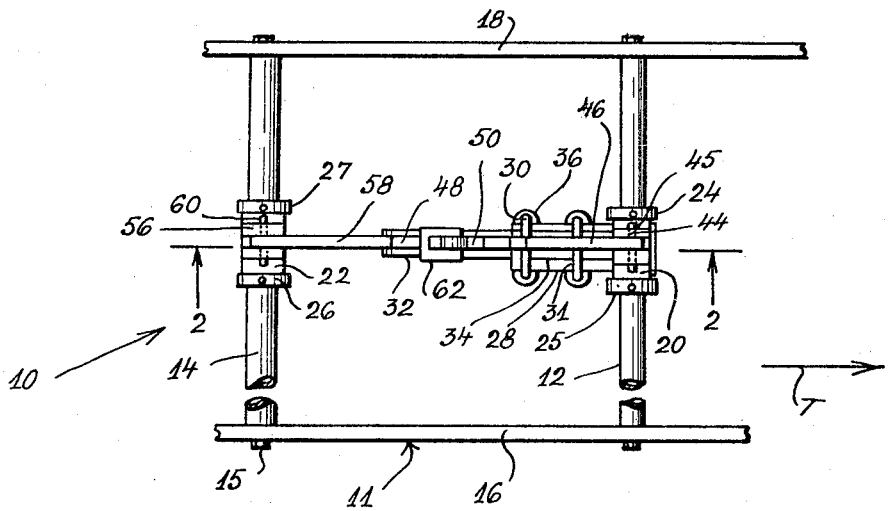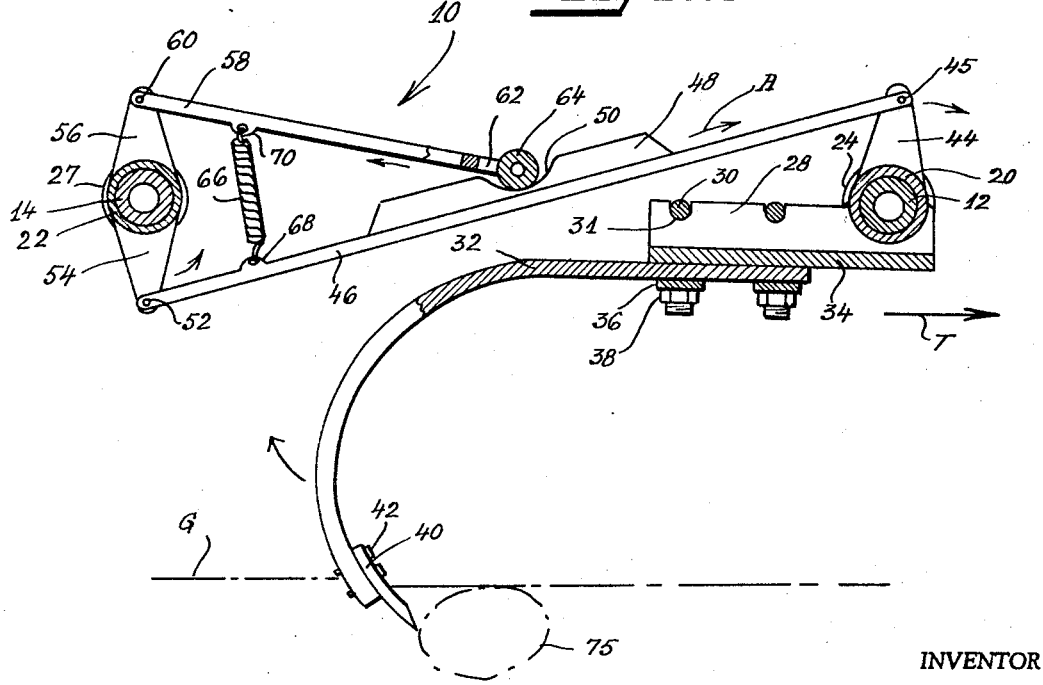

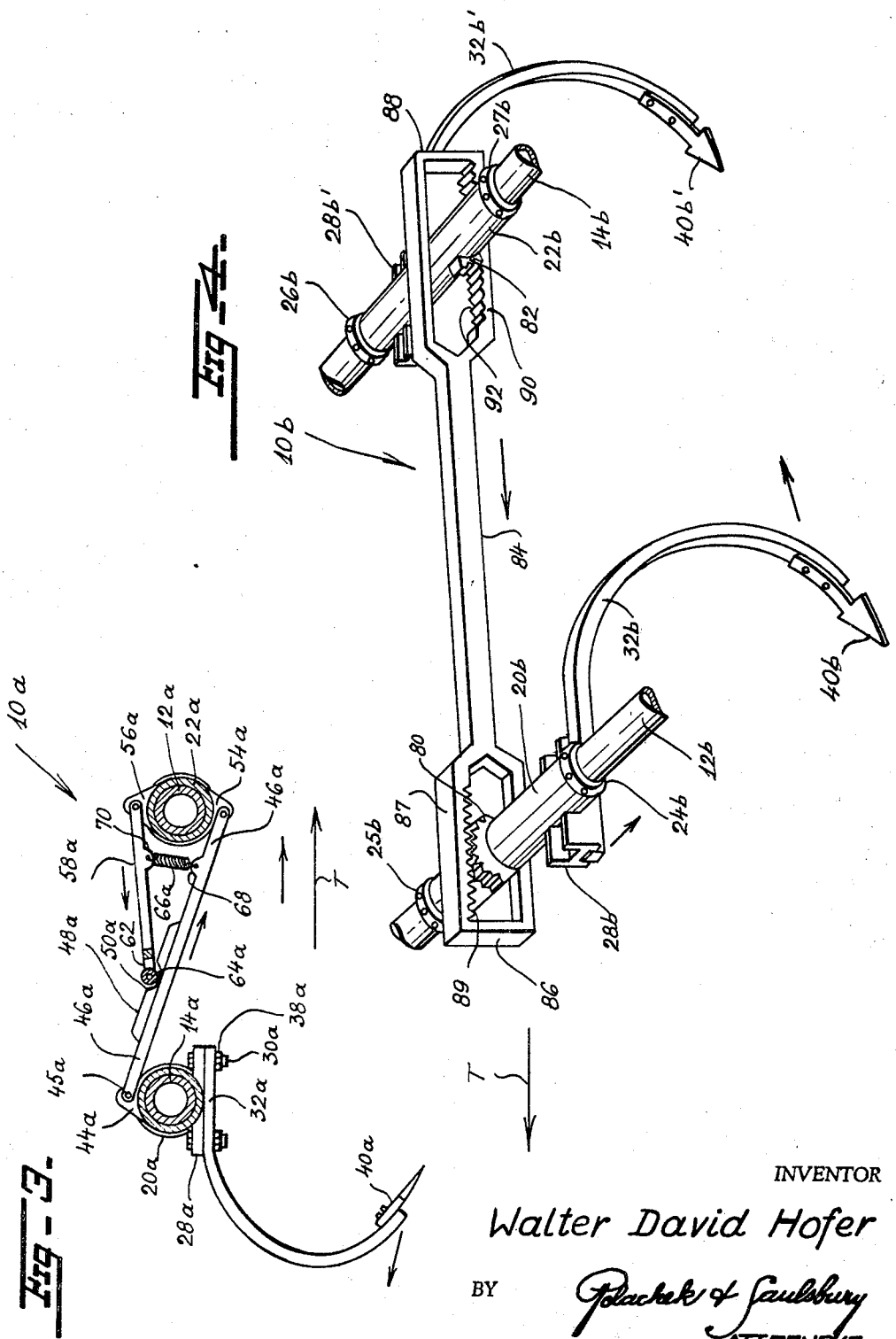

3,431,981
ECCENTRIC BEARING LINKAGE FOR HOE
DRILLS
Walter David Hofer, Brocket, Alberta, Canada
Filed July 5, 1966, Ser. No. 562,684
U.S. Cl. 172—269           8 Claims
Int. Cl. A01b 61/04, 19/08

ABSTRACT OF THE DISCLOSURE

A stabilized linkage for shank mountings in cultivators that does not sway or twist in loose ground or out of the ground, and that supports a shank retractably to yield if an obstruction is encountered. The linkage includes a shank mounting assembly having front and rear parallel shafts with rotatable bearings on the shafts. A bracket is secured to one of the shafts and a curved shank has one end attached to the bracket. A pair of arms radiate from the bearings and a pivoted link bar connects the arms. A block is carried by the link bar and is recessed. A third arm radiates from one of the bearings and a lever is attached at one end to said third arm. A roller on the lever rides in the recess in the block and a coiled spring is attached at opposite ends to the link bar and lever to hold the roller in the recess and retract the roller.

---

This invention concerns improved stabilized linkages for shank mountings in cultivators, hoe drills and the like.

One object of the invention is to provide a stabilized linkage which does not sway or twist in loose ground or out of the ground, and which supports a shank retractably to yield in an obstruction is enconutered.

A further object is to provide a linkage including an eccentric bearing supporting a shank to force the shovel carried by the shank into the ground, the linkage being arranged to retract the shank readily when an obstruction is encountered.

Another object is to provide a stabilized retractable linkage for two shanks employing a gear coupling for more positive action when obstructions are encountered.

A further object is to provide improved shank mountings for cultivators, whereby the shanks automatically clear obstacles yet quickly return to the ground without shifting, twisting or wobbling.

Another object is to provide a cultivator having dual shanks working in unison without side sway or play.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 1 is a top plan view of part of a cultivator showing a shank mounting assembly embodying the invention.

FIG. 2 is an enlarged vertical sectional view taken on line 2—2 of FIG. 1.

FIG. 3 is a reduced sectional view similar to part of FIG. 2 showing another embodiment of the invention, and FIG. 4 is a perspective view of another shank mounting assembly embodying a further form of the invention.

Referring first to FIGS. 1 and 2, there is shown part of the frame 11 of a cultivator including two axially parallel horizontal transverse cylindrical shafts 12, 14 spaced apart and disposed in the same horizontal plane. The shafts are secured at opposite ends by bolts 15 to side bars or plates 16, 18. Rotatably mounted on the stationary shafts 12, 14 are two short cylindrical bearings 20, 22. Stop rings 24, 25 and 26, 27 at opposite ends of the bearings are secured to the shafts 12, 14 to prevent axial movement of the bearings on the shafts. The front bearing 20 is welded to a short channel bracket 28 which extends rearwardly tangentially of the bearing and serves as an arm for rotating the bearing. The rear end portion of the bracket 28 is offset rearwardly of shaft 12. Secured by U-bolts 30 in recesses 31 of the bracket walls is a shank 32. The shank has a flat forward end abutted the underside 34 of the bracket. Cross plates or yokes 36 are disposed under the shank and nuts 38 are engaged on threaded ends of the bolts. Shovel 40 is shown removably attached by bolts 42 to the downwardly and forwardly extended free end of the shank.

Extending radially upward from the bearing 20 are two parallel tapered arms 44. Pivotally joined by a pin 45 to the arms 44 is the forward end of a link bar 46. On this bar at the center thereof is a bearing block 48 having a central recess 50. The link bar extends downwardly and rearwardly. The rear end of the link bar is pivotally secured by pin 52 to lower radial arms 54 attached to bearing 22. Aligned with arms 54 diametrally of the bearing 22 are two upper radial arms 56. A lever 58 has its rear end pivotally engaged by pin 60 on arms 56. The forward end 62 of the lever is forked and carries a roller 64 which is normally seated in the recess 50 of block 48. A coil spring 66 is secured at opposite ends to ears 68, 70 located on link bar 46 and lever 58 in a vertical plane between the bearing 22 and block 48.

During normal operation of the cultivator, the assembly will be drawn forward in the direction of arrow T. If shovel 40 encounters an obstruction 75 in ground G, shank 32, bracket 28 and arms 44 will be rotated clockwise with bearing 20 on front shaft 12. This will draw link bar 46 forwardly as indicated by arrow, A. Arms 54, 56 of bearing 22 will be tilted counterclockwise. At the same time, the lever 58 will be forced forwardly and roller 64 will ride up out of recess 50. This will tension spring 66. When the shovel 40 passes obstruction 75, the weight of the eccentrically mounted shank 32 will cause it to rotate counterclock wise as viewed in FIG. 2 and lever 58 will be drawn rearwardly again, assisted by contracting spring 66. The eccentric mounting of the shank thus serves to support the shank yieldably so that when in loose ground or out of the ground it assumes the position shown in FIG. 2.

The shank mounting assembly is very compact and disposed between the front and rear shafts 12 and 14. This is particularly desirable where space is very limited. A plurality of similar mounting assemblies will be mounted at other points along shafts 12 and 14. The several mountings will all be independent of each other and each will move to assume optimum working position in the ground.

FIG. 3 shows a shank mounting assembly 10a, which is generally similar to that of assembly 10 of FIGS. 1, 2. In this assembly, cylindrical bearing 20a is mounted on the rear transverse cylindrical shaft 14a.

Radial arms 44a extend upwardly from the bearing. A bearing support bracket 28a is welded to the underside of bearing 20a and extends tangentially thereof. The upper end of shank 32a is secured by bolts 30a and nuts 38a to the bracket 28a at opposite sides of the bearing 20a.

The upper rear end of link bar 46a is pivotally secured by pin 45a to arms 44a. The bar 46a extends forwardly and downwardly and is pivotally secured at its forward end to radial arms 54a of forward cylindrical bearing 22a. This bearing is mounted on the forward transverse cylindrical shaft 12a. The upper radial arms 56a of bearing 22a carry lever 58a which extends rearwardly and carries roller 64a normally disposed in recess 50a of block 48a on bar 46a. Coil spring 66a is connected at opposite ends to ears 68a and 70a located on bar 46a and lever 58a between block 48a and bearing 22a.

In operation of assembly 10a, the cultivator is normally drawn forward in direction T. If shovel 40a encounters an obstruction, shank 32a will rotate clockwise with bearing 20a on stationary shaft 14a. This will push bar 46a downwardly and forwardly and cause bearing 22a to turn counterclockwise. Lever 58 will be pushed rearwardly and roller 64 will ride up out of recess 50 on to block 48a. This will tension spring 66a. When obstruction is passed, the weight of shank 32 will turn it counterclockwise and all other parts will turn or move in opposite direction to restore the assembly to the working position shown in FIG. 3.

It will be noted that the shanks 32 and 32a of both assemblies are arranged to turn in vertical planes without twisting, sliding laterally, or wobbling. The main restoring action for the shanks is accomplished by the weight of the shanks themselves, with some assistance from the tensioned springs 68 and 68a. Since the shovel 40a is located slightly to the rear of the rear shaft 14a, this arrangement may be preferred for certain types of seeding operations where the shanks should be clear of the cultivator frame.

In FIG. 4 is shown another shank mounting assembly 10b oriented in the opposite direction from that of assemblies 10 and 10a. Stationary forward transverse shaft 12b and stationary rear tarnsverse shaft 14b carry short rotatable cylindrical bearings 20b and 22b. Rings 24b–27b prevent axial movement of the bearings on the shafts. Attached to forward bearing 20b is a channel bracket 28b carrying curved shank 32b. Shovel 40b is secured to the lower forwardly extending end of the shank.

Bearing 22b carries channel bracket 28b' to which is attached curved shank 32b'. Shovel 40b' is secured to the lower end of the shank. On the upper side of bearing 20b is a sector spur gear 80. On the underside of bearing 22b is another sector spur gear 82. A link bar 84 extends between the two bearings. The bar 84 terminates in two rectangular loops 86, 88 disposed in a vertical plane. The underside of upper wall 87 of loop 86 is formed with rack gear teeth 89. The upper, inwardly facing side of lower wall 90 of loop 88 is formed with rack gear teeth 92. The teeth 89 and 92 are engaged with gears 80 and 82 respectively.

In operation of assembly 10b, if either shovel 40b or 40b' encounters an obstruction while the cultivator is moving forward in direction T', the shank 32b or 32b' carrying the obstructed shovel will tilt counterclockwise as viewed in FIG. 4. This will cause one of the bearings 20b or 22b to turn and drive link bar 84 forwardly to rotate the other bearing. Thus, both shanks 32b and 32b' will turn up regardless of which shovel encounters an obstruction. The simultaneous dual lifting of the shovels occurs due to positive coupling between the shanks without lost motion, wobbling, vibration, twisting or other erratic action. It will be noted that the two shanks 32b and 32b' are located in vertical planes spaced apart on opposite sides of the link bar. Other similarly coupled shanks can be mounted on the shafts 12b and 14b, with each pair of shanks operating together to clear obstructions.

While I have illustrated and described the preferred embodiments of my invention it is to be understood that I do not limit myself to the precise construction herein disclosed and that various changes and modifications may be made within the scope of the invention as defined in the appended claims.

What is claimed is:

1. A shank mounting assembly for a cultivator, comprising front and rear horizontally spaced, axially parallel, coplanar transverse shafts, cylindrical bearings rotatably mounted on the respective shafts, a bracket secured to one of the bearings and extending tangentially thereof, a vertically disposed curved shank having its upper end attached to said bracket and its lower end extending downwardly and forwardly in the direction of travel of the cultivator, a first arm extending radially outward of said one bearing, a second arm extending radially outward of the other bearing, a link bar pivotally secured at opposite ends to the ends of the first and second arms respectively, a block carried by the link bar, said block having a recess in its upper side, a third arm extending radially outward of said other bearing, a lever pivotally attached at one end thereof to the third arm, a roller carried on the other end of the lever normally disposed in said recess in the block, and a coil spring attached at opposite ends to both the link bar and lever to hold said roller in said recess and to tend to restore the roller to the recess when the lever is displaced in the direction of its length upon rotation of the shank and said one bearing on one of the shafts.

2. A shank mounting assembly as recited in claim 1, wherein said one bearing is mounted on the front one of the shafts, so that the shank extends rearwardly between the front and rear shafts.

3. A shank mounting assembly as recited in claim 2, wherein said bracket extends rearwardly from said front shaft, and wherein the shank is attached to the bracket only at points offset rearwardly of the front shaft.

4. A shank mounting assembly as recited in claim 1, wherein said one bearing is mounted on the rear shaft so that the shank extends rearwardly beyond the rear shaft.

5. A shank mounting assembly as recited in claim 4, further comprising fastening means at opposite sides of the bearing detachably securing the shank to the bracket.

6. A shank mounting assembly as recited in claim 1, further comprising fastening means at opposite sides of said one bearing detachably securing the shank to the bracket.

7. A shank mounting assembly as recited in claim 1, further comprising means on the shafts preventing axial movement of the bearings on the shafts.

8. A shank mounting assembly as recited in claim 1, wherein the bracket extends laterally from said one shaft, so that the attachment of the shank to the bracket is offset laterally from said one shaft.

References Cited

UNITED STATES PATENTS

| | | | |
|---|---|---|---|
| 625,793 | 5/1899 | Naylor | 172—142 X |
| 1,040,488 | 10/1912 | Archambeau | 172—421 X |
| 3,331,451 | 7/1967 | Zoeteman | 172—657 |

FOREIGN PATENTS

| | | |
|---|---|---|
| 209,121 | 1/1924 | Great Britain. |

ABRAHAM G. STONE, *Primary Examiner.*

JIMMIE R. OAKS, *Assistant Examiner.*

U.S. Cl. X.R.

172—657